United States Patent [19]

Mookherjee et al.

[11] 3,996,296

[45] Dec. 7, 1976

[54] NOVEL COMPOUNDS, 4-(2,6,6-TRIMETHYL-1,3-CYCLOHEXADIEN-1-YL)-2-BUTANOL AND 4-(6,6-DIMETHYL-2-METHYLENE-3-CYCLOHEXEN-1-YL)-2-BUTANOL

[75] Inventors: Braja Dulal Mookherjee, Matawan; Manfred Hugo Vock, Locust, both of N.J.; Carlos Benaim, Hartsdale; Edward J. Shuster, Brooklyn, both of N.Y.

[73] Assignee: International Flavors & Fragrances Inc., New York, N.Y.

[22] Filed: Mar. 24, 1975

[21] Appl. No.: 561,187

Related U.S. Application Data

[63] Continuation-in-part of Ser. No. 461,704, April 17, 1974, Pat. No. 3,899,597.

[52] U.S. Cl. .......................... 260/617 R; 252/522; 426/650; 426/538; 260/488 R; 260/586 R
[51] Int. Cl.² .......................................... C07C 31/13
[58] Field of Search ....... 260/617 R, 617 A, 617 D, 260/631.5, 617; 252/522

[56] References Cited

UNITED STATES PATENTS

| | | | |
|---|---|---|---|
| 2,803,662 | 8/1957 | Stoll | 260/617 R |
| 3,268,589 | 8/1966 | Roland | 260/617 R |
| 3,743,671 | 7/1973 | Teisseire et al. | 260/617 R |
| 3,923,873 | 12/1975 | Maurer et al. | 260/617 R |

OTHER PUBLICATIONS

Sato et al., Tetrahedron Letters, No. 22, pp. 1803–1804 (1969).
Beilstein wk3, vol. 6, system No. 510, pp. 401–402.
Schulte–Eito, Helv. Chimica Acto, vol. 56, pp. 310–320 (1973).

*Primary Examiner*—James O. Thomas, Jr.
*Assistant Examiner*—James H. Reamer
*Attorney, Agent, or Firm*—Arthur L. Liberman; Harold Haidt

[57] ABSTRACT

Described are the novel compounds, 4-(2,6,6-trimethyl-1,3-cyclohexadien-1-yl)-2-butanol and 4-(6,6-dimethyl-2-methylene-3-cyclohexen-1-yl)-2-butanol, and processes for preparing the aforementioned alcohols and acetate esters thereof.

1 Claim, 3 Drawing Figures

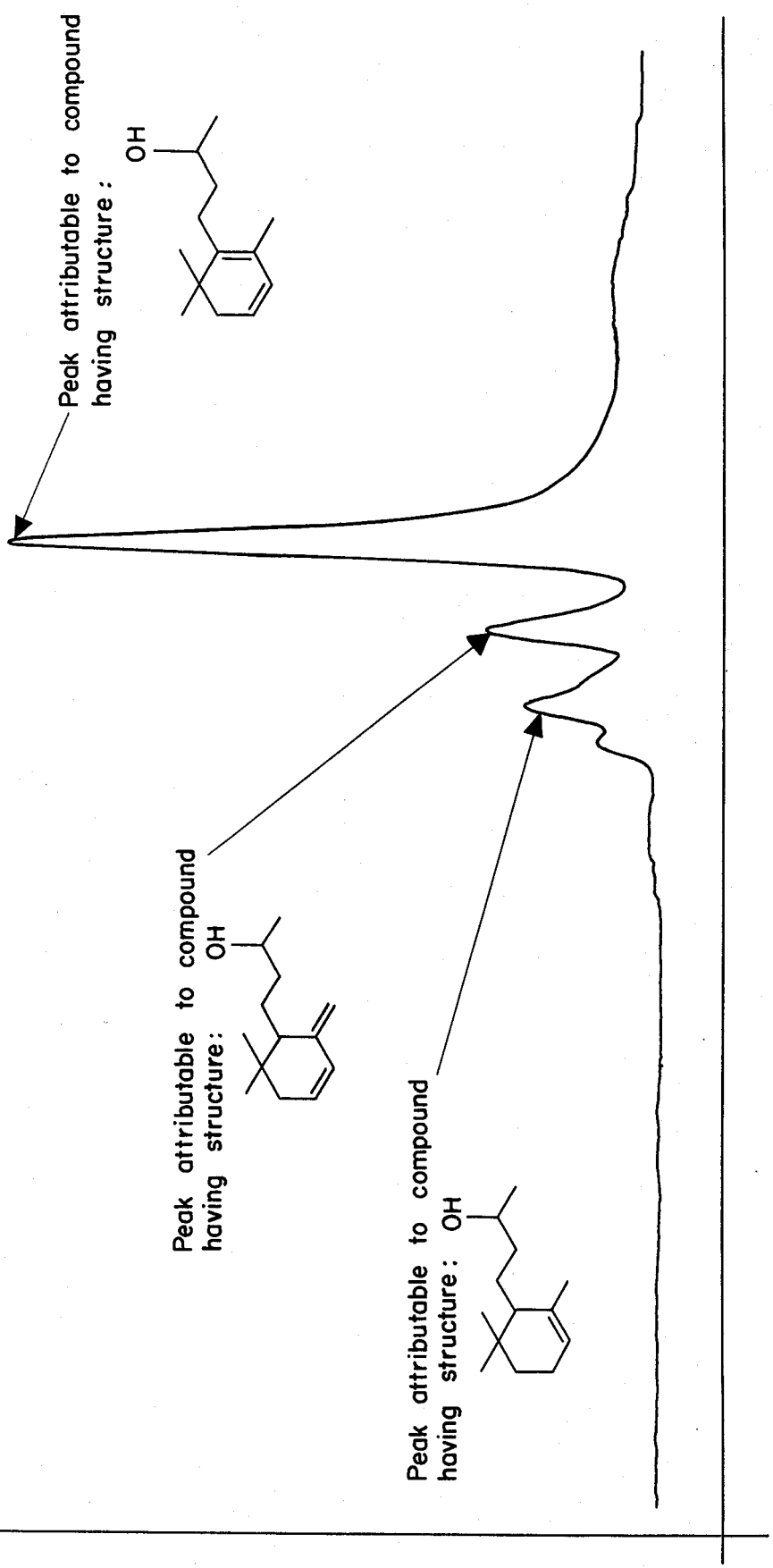
FIG. I
EXAMPLE IV
GLC CURVE

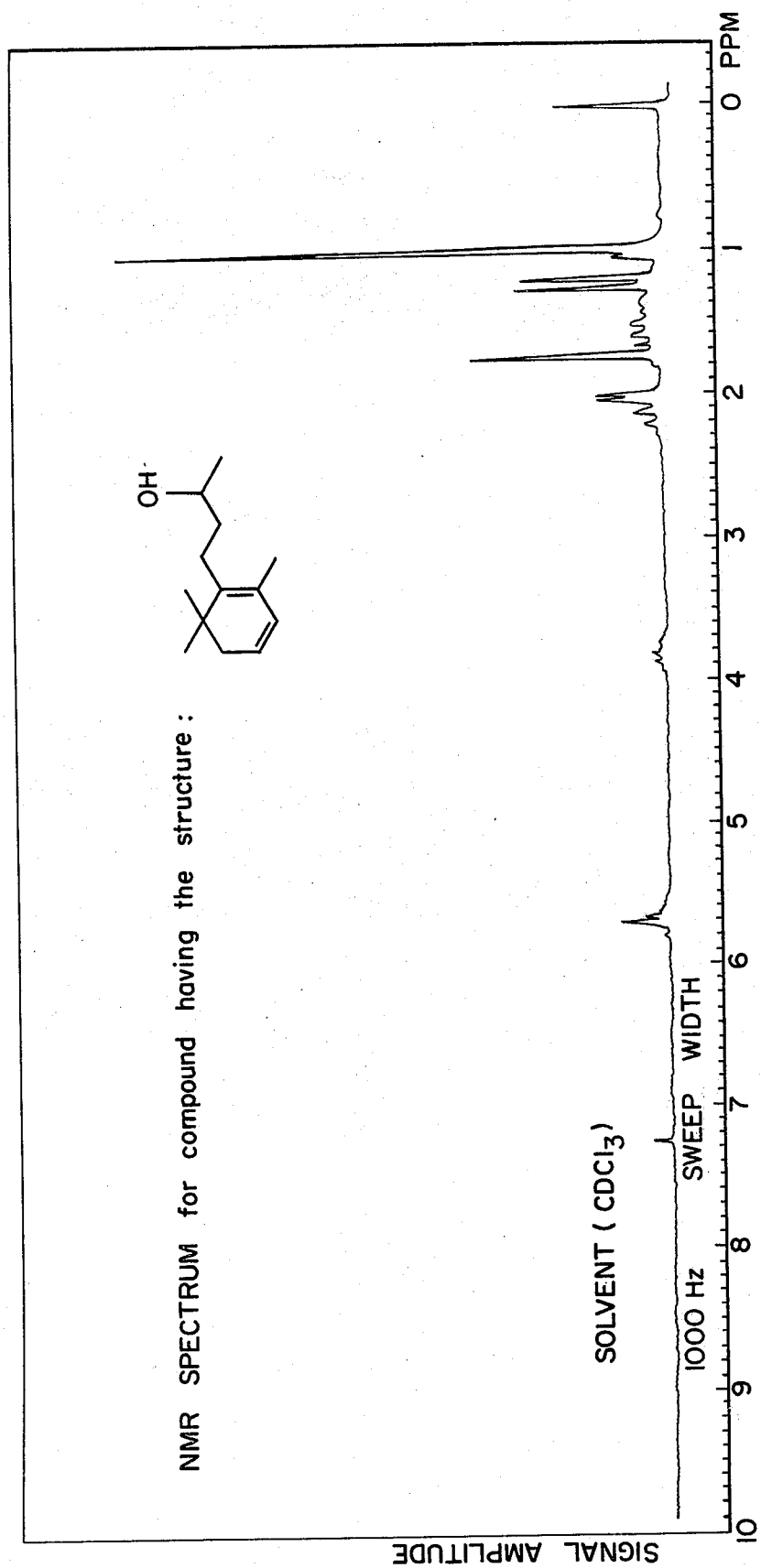

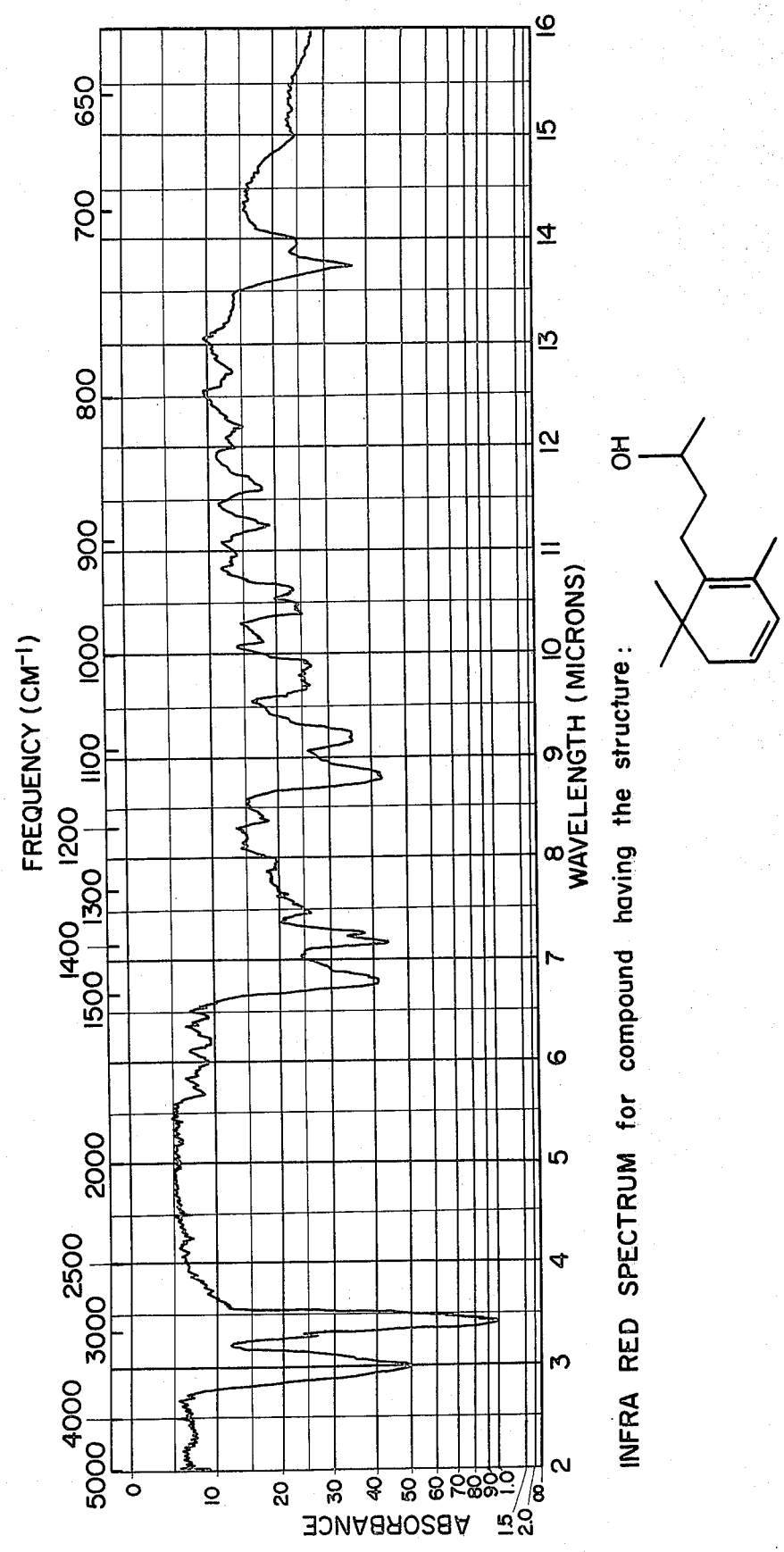

NOVEL COMPOUNDS, 4-(2,6,6-TRIMETHYL-1,3-CYCLOHEXADIEN-1-yl)-2-BUTANOL AND 4-(6,6-DIMETHYL-2-METHYLENE-3-CYCLOHEXEN-1-yl)-2-BUTANOL

This application is a continuation-in-part of U.S. application for Letters Patent Ser. No. 461,704 filed on Apr. 17, 1974, now U.S. Pat. No. 3,899,597 issued on Aug. 12, 1975.

BACKGROUND OF THE INVENTION

The present invention relates to the novel compounds 4-(2,6,6-trimethyl-1,3-cyclohexadien-1-yl)-2-butanol and 4-(6,6-dimethyl-2-methylene-3-cyclohexen-1-yl)-2-butanol and processes for preparing the aforementioned butanols and acetates thereof.

There has been considerable work performed relating to substances which can be used to impart (or enhance) flavors to (or in) various consumable materials. These substances are used to diminish natural materials some of which may be in short supply and provide more uniform properties in finished products. Violet, green, floral, woody and piney aroma notes are particularly desirable for many uses in fruit flavoring compositions and consumable articles, e.g., foodstuffs. Leathery, green, orris, seashore, mimosa, clary sage, woody, fruity, ionone and musky aromas are particularly desirable in perfume compositions.

The flavor and fragrance material having the structure:

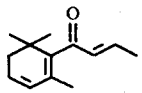

is disclosed in British Patent No. 1,305,621 issued on Feb. 7, 1973.

4-(2,6,6-trimethyl-1,3-cyclohexadien-1-yl)-2-butanone having the structure:

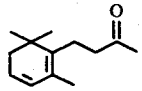

may be synthesized according to the technique of Wolf and Zink, Volume 56, Helvetica Chimica Acta., Fasc 3 (1973) pp. 1062–1066, or according to Examples I and II of Rowland, U.S. Pat. No. 3,436,421 issued on Apr. 1, 1969 by means of bromination of -dihydroionone followed by debromination. 4-(6,6-dimethyl-2-methylene-3-cyclohexen-1-yl)-2-butanone having the structure:

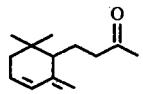

is also produced in this process as a bi-product thereof (B.P. 65° C at 0.15 mm Hg. pressure). 4-(2,6,6-trimethyl-1,3-cyclohexadien-1-yl)-2-butanone is also shown to be a bi-product in the cyclization of ionone to beta ionone by Kruk and De Boer in Volume 87 Recueil (1968) pp. 641–654 as an intermediate in preparing other perfumery compounds. The compound having the structure:

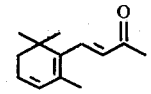

is disclosed in Japanese Patent No. 7121,015 (Sakan and Isoe) issued June 14, 1971.

Japanese Patent No. 7404,391 discloses a synthesis of the compound having the structure:

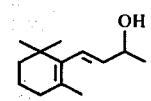

from a compound having the structure:

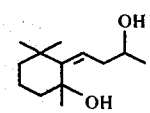

This patent indicates that the synthesized compound can improve the aroma and quality of distilled spirits. Compounds of the structures:

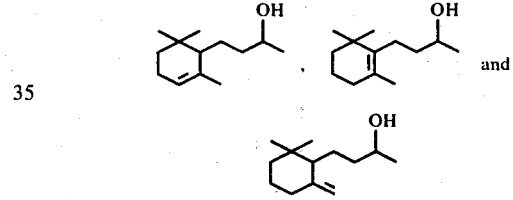

are indicated to be intermediates in the synthesis gamma-dihydroionone by Stoll, Helv. Chim. Acta., 38, 1587 (1955) and British Patent No. 794,416. The synthesis of the compound having the structure:

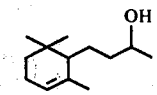

is disclosed by Naves and Bachmann, Helv. Chim. Acta., 26, 2151 (1943).

Sato and Mashima, Tetrahedron Letters No. 22, Page 1803 (1969) discloses the synthesis of theaspirone from the material having the structure:

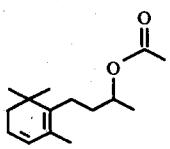

but no odor qualities of this acetate are set forth therein. Demole et al., Helv. Chim. Acta., 53, 541 (1970) discloses the synthesis of the alcohol having the structure:

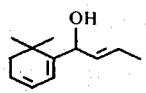

Arctander, "Perfume and Flavor Chemicals" (Aroma Chemicals), 1969 discloses in Vol. I at 1775 "beta-ionol" having the structure:

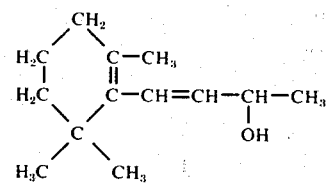

as having a "sweet, oily-herbaceous, warm odor with floral-balsamic undertones . . . some resemblance to Labdanum notes" Arctander further states that "this secondary alcohol has been suggested for use in perfume compositions as a modifier in various types of floral and non-floral fragrances. It blends well with Labdanum, Lavender, Lavandin, Clary Sage, etc. and it has a refreshing effect upon Rose types. It performs pleasantly with the eliphatic aldehydes into refreshing notes varying from Pine to Rose, and it was at one time and used in several types of detergent fragrances". It is produced by reduction of beta-ionone with sodium alcoholate or by Meerwein-Ponndorf-Verley reduction.

THE INVENTION

It has now been discovered that solid and liquid foodstuff and flavoring compositions having violet, green, floral, woody and piney aroma notes reminiscent of red-berry-like flavors; and aroma imparting compositions having leathery, green, orris, seashore, mimosa, clary sage, woody, fruity, ionone character with a slight musky nuance characteristics may be provided by the utilization of 4-(2,6,6,-trimethyl-1,3-cyclohexadien-1yl)-2-butanol and/or 4-(6,6-dimethyl-2-methylene-3-cyclohexen-1-yl)-2-butanol and/or acetates thereof having the generic structure:

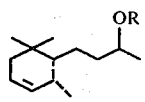

wherein R is acetyl or hydrogen and wherein one of the dashed lines represents a carbon-carbon double bond, and the other dashed line represents a carbon-carbon single bond. Thus, the 4-(2,6,6-trimethyl-1,3-cyclohexadien-1-yl)-2-butanol and/or 4-(6,6-dimethyl-2-methylene-3-cyclohexen-1-yl)-2-butanol and/or acetates thereof of our invention are capable of supplying and/or potentiating certain flavor and aroma notes usually lacking in many red-berry type flavors as well as notes usually lacking in many perfumery materials, e.g., "orris" and "clary sage".

The 4-(2,6,6-trimethyl-1,3-cyclohexadien-1-yl)-2-butanol and/or 4-(6,6-dimethyl-2-methylene-3-cyclohexen-1-yl)-2-butanol and/or acetates thereof may be prepared by first forming dihydro-α-ionol from dihydro-α-ionone according to the following reaction:

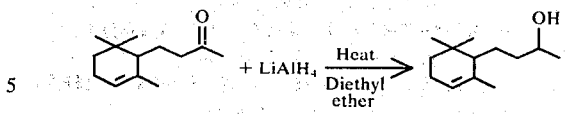

The reaction is preferably carried out in an inert solvent such as diethyl ether at reflux temperatures, e.g., the boiling point of the solvent at atmospheric pressure.

The dihydro-α-ionol is then esterified via normal esterification procedures according to the following reaction:

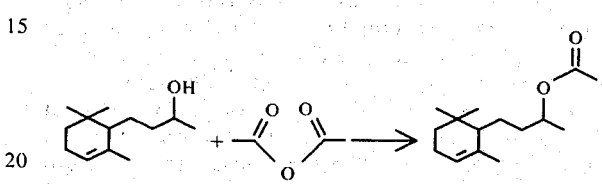

to form the acetate which is, in turn, dehydrogenated, using quinoline, preferably in an inert solvent such as chloroform, at temperatures of the order of −5° C up to +10° C at atmospheric pressure, according to the following reaction:

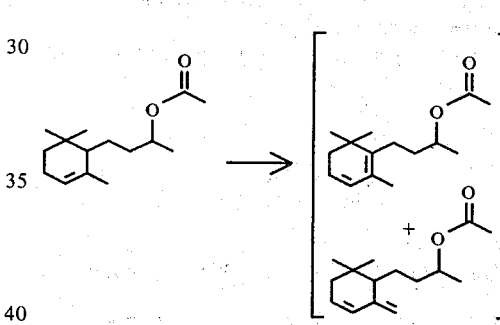

The resulting product, consisting of 70–90% cyclohexadiene derivative and 30–10% of methylene cyclohexene derivative may be used as a flavor or perfumery ingredient, "as-is" or it may be separated (e.g., using gas-liquid chromatography techniques) or it may be saponified to the corresponding alcohol mixture using standard saponification techniques thus:

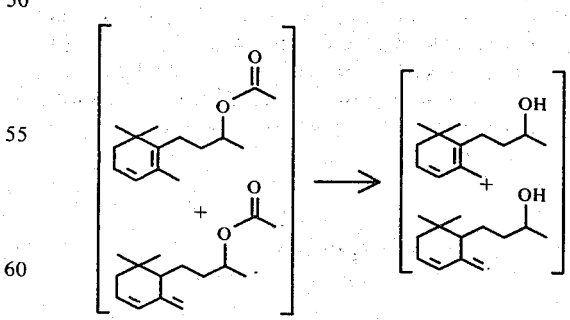

The saponification is carried using a base (e.g., KOH or NaOH) preferably in an alcohol solvent medium (e.g., ethanol) at ambient conditions (although temperatures of 50°–60° C will cause the saponification reaction to process more rapidly).

The resulting product, consisting of 70–90% cyclohexadiene derivative and 30–10% of methylene cyclohexene derivative may be used as a flavor or perfumery ingredient as-is or it may be separated (e.g., using gas-liquid chromatography techniques).

When the 4-(2,6,6-trimethyl-1,3-cyclohexadien-1-yl)-2-butanol and/or 4-(6,6-dimethyl-2-methylene-3-cyclohexen-1-yl)-2-butanol and/or acetates thereof of our invention is used as a food flavor adjuvant the nature of the co-ingredients included with the said 4-(2,6,6-trimethyl-1,3-cyclohexadien-1-yl)-2-butanol and/or 4-(6,6-dimethyl-2-methylene-3-cyclohexen-1-yl)-2-butanol and/or acetates thereof in formulating the product composition will also serve to alter the organoleptic characteristics of the ultimate foodstuffs treated therewith. As used herein in regard to flavors, the term "alter" in its various forms means "supplying or imparting flavor character or note to otherwise bland, relatively tasteless substance or augmenting the existing flavor characteristic where a natural flavor is deficient in some regard or supplementing the existing flavor impression to modify its quality, character or taste". As used herein, the term "foodstuff" includes both solid and liquid ingestible materials which usually do but need not have nutritional value. Thus, foodstuffs include meats, gravies, soups, convenience foods, beverages, dairy products, candies, vegetables, cereals, soft drinks, snacks and the like.

Substances suitable for use herein as co-ingredients or flavoring adjuvants are well known in the art for such use being extensively described in the relevant literature. Apart from the requirement that any such material be "ingestibly" acceptable and thus non-toxic or otherwise non-deleterious nothing particularly critical resides in selection thereof. Accordingly, such materials which may in general be characterized as flavoring adjuvants or vehicles comprise broadly stabilizers, thickeners, surface active agents, conditioners, other flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiarybutyl-4-methyl phenol), propyl gallate and the like, and sequestrants, e.g., citric acid.

Thickener compounds include carriers, binders, protective colloids, suspending agents, emulsifiers, and the like, e.g., agaragar; carrageenan; cellulose and cellulose derivatives such as carboxymethyl cellulose and methyl cellulose; natural and synthetic gums such as gum arabic, gum tragacanth; gelatine, proteinaceous materials; lipids; carbohydrates; starches pectins, and emulsifiers, e.g., mono-and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono-and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcumin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acid, e.g., fatty saturated acids, unsaturated acids and amino acids; alcohols, e.g., primary and secondary alcohols; esters; carbonyl compounds, e.g., aldehydes and ketones as well as lactones; cyclic organic materials including benzene derivatives; isocyclics, heterocyclics such as furans particularly 2,5-dimethyl-3-acetyl furan and 2-methyl-2,3-dihydro furan-3-one, pyridines, pyrazines (particularly monoalkyl, dialkyl, trialkyl and tetra-alkyl substituted pyrazines) and the like, sulfur-containing materials including thiazoles, disulfides, thiols, sulfides, aldehydes, (for example, 3-phenyl-4-pentenal, 3-phenyl-3-pentenal, 3-phenyl-2-pentenal, 2-phenyl-2-pentenal and 2-phenyl-3-methyl-2-butenal); disulfides and the like; other flavor potentiators such as monosodium glutamate, guanylates, inosinates, natural and synthetic flavorants such as vanillin, ethyl vanillin, diacetyl, phenethyl-2-furoate, maltol, natural gums and the like; spices, herbs, essential oils and extractives including "bitterness principles" such as theobromin, caffein, naringin and other suitable materials creating a bitter effect.

The specific flavoring adjuvant selected for use may be either solid or liquid depending upon the desired physical form of the ultimate product, i.e., foodstuff, whether simulated or natural, and should, in any event, be capable of providing an environment in which the 4-(2,6,6-trimethyl-1,3-cyclohexadien-1-yl)-2-butanol and/or 4-(6,6-dimethyl-2-methylene-3-cyclohexen-1-yl)-2-butanol and/or acetates thereof can be dispersed or admixed to provide a homogeneous medium. In addition, selection of one or more flavoring adjuvants as well as the quantities thereof will depend upon the precise organoleptic character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of 4-(2,6,6-trimethyl-1,3-cyclohexadien-1-yl)-2-butanol and/or 4-(6,6-dimethyl-2-methylene-3-cyclohexen-1-yl)-2-butanol and/or acetates thereof employed in a particular instance can vary over a relatively wide range whereby to its desired organoleptic effects having reference to the nature of the product are achieved. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for purposes of enhancing the composition merely deficient in natural flavor or aroma. Thus, the primary requirement is that the amount selected to be effective, i.e., sufficient to alter the organoleptic characteristics of the parent composition, whether foodstuff per se or flavoring composition. Thus, the use of insufficient quantities of 4-(2,6,6-trimethyl-1,3-cyclohexadien-1-yl)-2-butanol and/or 4-(6,6-dimethyl-2-methylene-3-cyclohexen-1-yl)-2-butanol and/or acetates thereof will, of course, substantially vitiate any possibility of obtaining the desired results while excess quantities prove needlessly costly and in extreme cases, may disrupt the flavor-aroma balance, thus providing self-defeating. Accordingly, the terminology "effective amount" and "sufficient amount" is to be accorded a significance in the context of the present invention consistent with the obtention of desired flavoring effects.

Thus and with respect to ultimate food compositions, it has been found that quantities of 4-(2,6,6-trimethyl-1,3cyclohexadiene-1-yl)-2-butanol and/or 4-(6,6-dimethyl-2-methylene-3-cyclohexen-1-yl)-2-butanol and/or acetates thereof ranging from a small but effective amount, e.g., 0.02 parts per million up to about 50 parts per million by weight based on total composition are suitable. Concentrations in excess of the maximum quantity stated are not normally recommended since they fail to provide commensurate enhancement of organoleptic properties. In those cases wherein the 4-(2,6,6-trimethyl-1,3-cyclohexadien-1-yl)-2-butanol and/or 4-(6,6-dimethyl-2-methylene-3-cyclohexen-1-yl)-2-butanol and/or acetates thereof is added to the foodstuff as an integral component of the flavoring composition, it is, of course, essential that the total quantity of flavoring composition employed be sufficient to yield an effective 4-(2,6,6-trimethyl-1,3-cyclohexadien-1-yl)-2-butanol and/or 4-(6,6-dimethyl-2-methylene-3-cyclohexen-1-yl)-2-butanol and/or acetates thereof concentration in the foodstuff product.

Food flavoring compositions prepared in accordance with the present invention preferably contain 4-(2,6,6-trimethyl-1,3-cyclohexadien-1-yl)-2-butanol and/or 4-(6,6-dimethyl-2-methylene-3-cyclohexen-1-yl)-2-butanol and/or acetates thereof in concentrations ranging from about 0.02% up to about 10% by weight based on a total weight of said flavoring composition.

The compositions described herein can be prepared according to conventional techniques well known as typified by cake batters and vegetable juices and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the 4-(2,6,6-trimethyl-1,3-cyclohexadien-1-yl)-2-butanol and/or 4-(6,6-dimethyl-2-methylene-3-cyclohexen-1-yl)-2-butanol and/or acetates thereof with for example gum arabic, gum tragacanth, carrageenan and the like and thereafter spray-drying the resultant mixture whereby to obtain the particular solid product. Pre-prepared flavor mixes in powder form, e.g., a red currant mix or a fruit flavored powder obtained by mixing dried solid components, e.g., starch, sugar and the like and 4-(2,6,6-trimethyl-1,3-cyclohexadien-1-yl)-2-butanol and/or 4-(6,6-dimethyl-2-methylenecyclohexen-1-yl)-2-butanol and/or acetates thereof in a dry blender until the requisite degree of uniformity is achieved.

It is presently preferred to combine the 4-(2,6,6-trimethyl-1,3-cyclohexadien-1-yl)-2butanol and/or 4-(6,6-dimethyl-2-methylene-3-cyclohexen-1-yl)-2-butanol and/or acetates thereof with the following adjuvants:

| | |
|---|---|
| Vanillin | Methyl Anthranilate |
| Ethyl Caproate | Methyl Heptinyl Carbonate |
| Citral | Methyl Salicylate |
| Amyl Butyrate | Beta Ionone |
| Ethyl Butyrate | Gamma Undecalactone |
| Ethyl Acetate | Diacetyl |
| Amyl Acetate | Anethol |
| Cinnamyl Aldehyde | Isobutyl Acetate |
| Maltol | Alpha Ionone |
| Acetic Acid | p-Hydroxy Benzyl Acetone |
| Ethyl Methyl Phenyl Glycidate | Dimethyl Sulfide |
| Benzyl Acetate | Acetaldehyde |
| Methyl Cinnamate | |

One or more of the 4-(2,6,6-trimethyl-1,3-cyclohexadien-1-yl)-2-butanol and/or 4-(6,6-dimethyl-2-methylene-3-cyclohexen-1-yl)-2-butanol and/or 4-(2,6,6-trimethyl-1,3-cyclohexadien-1-yl)-2-butyl acetate and/or 4-(6,6-dimethyl-2-methylene-3-cyclohexen-1-yl)-2-butyl acetate of our invention and an auxiliary perfume ingredient including, for example, alcohols, aldehydes, nitriles, esters, cyclic esters and natural essential oils may be admixed so that the combined odors of the individual components produce a pleasant or desired fragrance. Such perfume compositions usually contain (a) the main note or the "bouquet" or foundation stone of the composition; (b) modifiers which round off and accompany the main note; (c) fixatives which include odorous substances which lend a particular note to the perfume throughout all stages of evaporation and substances which retard evaporation; and (d) topnotes which are usually low boiling fresh smelling materials.

In perfume compositions, the individual component will contribute its particular olfactory characteristics but the over-all effect of the perfume composition will be the sum of the effects of each of the ingredients. Thus, 4-(2,6,6-trimethyl-1,3-cyclohexadien-1-yl)-2-butanol and/or 4-(6,6-dimethyl-2-methylene-3-cyclohexen-1-yl)-2-butanol and/or 4-(2,6,6-trimethyl-1,3-cyclohexadien-1-yl)-2-butyl acetate and/or 4-(6,6-dimethyl-2-methylene-3-cyclohexen-1-yl)-2-butyl acetate can be used to alter the aroma characteristics of a perfume composition, for example, by utilizing or moderating the olfactory reaction contributed by another ingredient in the composition.

The amount of the 4-(2,6,6-trimethyl-1,3-cyclohexadien-1-yl)-2-butanol and/or 4-(6,6-dimethyl-2-methylene-3-cyclohexen-1-yl)-2-butanol and/or 4-(2,6,6-trimethyl-1,3-cyclohexadien-1-yl)-2-butyl acetate and/or 4-(6,6-dimethyl-2-methylene-3-cyclohexen-1-yl)-2-butyl acetate of our invention which will be effective in perfume compositions depend on many factors including the other ingredients, their amounts and the effects which are desired. It has been found that perfume compositions containing as little as 0.05% or 4-(2,6,6-trimethyl-1,3-cyclohexadien-1-yl)-2-butanol and/or 4-(6,6-dimethyl-2-methylene-3-cyclohexen-1-yl)-2-butanol and/or 4-(2,6,6-trimethyl-1,3-cyclohexadien-1-yl)-2-butyl acetate and/or 4-(6,6-dimethyl-2-methylenecyclohexen-1-yl)-2-butyl acetate or even less can be used to impart a floral, seashore, clary sage, orrisy type scent odor to soaps, cosmetics and other products. The amount employed can range up to 80% of the fragrance components and will depend on considerations of cost, nature of the end product, the effect desired on the finished product and the particular fragrance sought.

4-(2,6,6-trimethyl-1,3-cyclohexadien-1-yl)-2-butanol and/or 4-(6,6-dimethyl-2-methylene-3-cyclohexen-1-yl)-2-butanol and/or 4-(2,6,6-trimethyl-1,3-cyclohexadien-1-yl)-2-butyl acetate and/or 4-(6,6-dimethyl-2-methylene-3-cyclohexen-1-yl)-2-butyl acetate are useful in perfume compositions as olfactory components in detergents and soaps; space odorants and deodorants; perfumes; colognes; toilet water; bath preparations such as bath oils and bath solids; hair preparations such as lacquers, brilliantines, pomades and shampoo; cosmetic preparations such as creams, deodorants, hand lotions and sunscreens; powders such as talcs, dusting powders, face powders and the like. When used as an olfactory component of a perfumed article as little as 100 parts per million of the 4-(2,6,6-trimethyl-1,3-cyclohexadien-1-yl)-2-butanol and/or 4-(6,6-dimethyl-2-methylene-3-cyclohexen-1-yl-2-butanol and/or 4-(2,6,6-trimethyl-1,3-cyclohexadien-1-yl)-2-butyl acetate and/or 4-(6,6-dimethyl-2-methylene-3-cyclohexen-1-yl)-2-butyl acetate will suffice to impart a low keyed floral, seashore, clary sage, orrisy character which is one of the key odor characteristics of "mimosa" and "orris" perfume formulations. Generally, no more than 0.5% of 4-(2,6,6-trimethyl-1,3-cyclohexadien-1-yl)-2-butanol and/or 4-(6,6-dimethyl-2-methylene-3-cyclohexen-1-yl)-2-butanol and/or 4-(2,6,6-trimethyl-1,3- cyclohexadien-1-yl)-2-butyl acetate and/or 4-(6,6-dimethyl-2-methylene-3-cyclohexen-1-yl)-2-butyl acetate based on the ultimate end product is required in the perfume composition.

In addition, the perfume composition or fragrance composition of this invention contains a vehicle or carrier for the 4-(2,6,6-trimethyl-1,3-cyclohexadien-1-yl)-2-butanol and/or 4-(6,6-dimethyl-2-methylene-3-cyclohexen-1-yl)-2-butanol and/or 4-(2,6,6-trimethyl-1,3-cyclohexadien-1-yl)-2-butyl acetate and/or 4-(6,6-dimethyl-2-methylene-3-cyclohexen-1-yl)-2-butyl acetate. The vehicle can be a liquid such as an alcohol, a non-toxic alcohol, a non-toxic glycol or the like. The carrier can also be an absorbent solid such as a gum (e.g., gum arabic) or components for encapsulating the composition (such as gelatine).

It will thus be apparent that 4-(2,6,6-trimethyl-1,3-cyclohexadien-1-yl)-2-butanol and/or 4-(6,6-dimethyl-2-methylene-3-cyclohexen-1-yl)-2-butanol and/or 4-(2,6,6-trimethyl-1,3-cyclohexadien-1-yl)-2-butyl acetate and/or 4-(6,6-dimethyl-2-methylene-3-cyclohexen-1-yl)-2-butyl acetate can be utilized to alter the sensory properties, particularly organoleptic properties such as flavor and/or fragrances of a wide variety of consumable materials.

In making the perfumes using the materials produced by the instant invention, such materials can be combined with "auxiliary perfume adjuvants" including one or more of many types of odor materials such as bergamot oil, vetiver oil, patchouli oil, sandalwood oil, oakmoss and floral musk. The materials produced according to this invention can also be combined with a customary perfume auxiliary adjuvants such as natural oils, synthetic oils, aldehydes, ketones, carboxylic acid esters, aryl alcohols, alkanols, lactones, saturated hydrocarbons, unsaturated hydrocarbons, fixatives, solvents, dispersants, surface active agents, aerosol propellants and the like.

The following examples serve to illustrate embodiments of our invention as it is now preferred to practice it. It will be understood that these examples are illustrative, and the invention is to be considered restrictive thereto only as indicated in the appended claims.

EXAMPLE I

Preparation of Dihydro-α-Ionol from Dihydro-α-Ionone

Reaction:

Reaction:

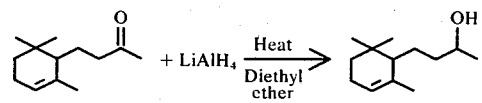

One liter of diethyl ether is added to a 3 liter reaction flask equipped with reflux condenser, stirrer, thermometer, nitrogen purge, addition funnel and heating mantle. 10 Grams of lithium aluminum hydride is then added slowly to the diethyl ether. 130 Grams of dihydro-α-ionone in 400 ml diethyl ether is then added to the lithium aluminum hydride-diethyl ether mass over a period of 1.5 hours. The rate of addition is adjusted to promote and continue refluxing. After the addition of other dihydro-α-ionone is complete, the reaction mass is refluxed using heat provided by a heating mantle. The reaction mass is then cooled to 5° C and the excess lithium aluminum hydride is decomposed with 50 ml of water.

The resulting precipitate is vacuum filtered and the aqueous layer is separated from the organic (ether) layer. The resulting organic phase is then washed twice with 100 ml portions of saturated aqueous sodium chloride solution, and dried over anhydrous magnesium sulfate. The ether is then evaporated yielding 110 gm. residue, confirmed by IR analysis to be an alcohol having the structure:

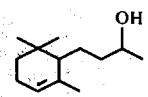

EXAMPLE II

Preparation of Dihydro-α-Ionol Acetate

Reaction:

Reaction:

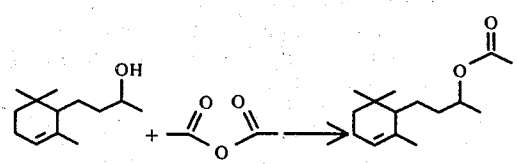

To a one liter reaction flask equipped with reflux condenser, stirrer and heating mantle is added 100 gm. of the dihydro-α-ionol produced according to the process of Example I (0.56 moles), 171 gm. of acetic anhydride (1.68 moles) and 35.0 gm. of sodium acetate (0.25 moles). The mixture is then refluxed for 3 hours, and then cooled and 200 ml of water is added to the reaction mass. The reaction mass is warmed on a steam bath for a period of 0.5 hours and then cooled to room temperature. After cooling, the reaction mass is extracted with three 100 ml portions of diethyl ether. The diethyl ether extracts are combined and washed as follows:
i. Five 50 ml portions of 5% aqueous sodium carbonate solution; and
ii. Two 100 ml portions of saturated NaCl solution;

The ether extracts are then dried over anhydrous magnesium sulfate, and evaporated leaving 121 gm. of residue, as ester having the structure:

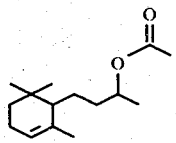

EXAMPLE III

Preparation of Dehydrodihydroionol Acetate from Dihydroionol Acetate

Reaction:

Reaction:

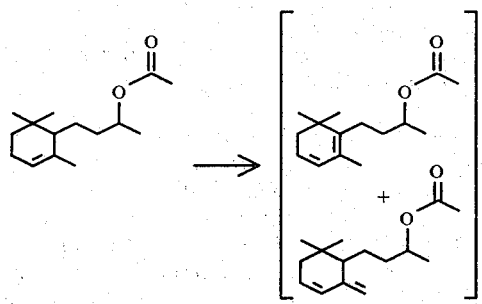

To a 2 liter reaction flask equipped with reflux condenser, thermometer, dry ice bath, addition funnel and nitrogen purge the following materials are added:

| | | |
|---|---|---|
| (i) Dihydro-α-Ionol prepared according to the process of Example II | 120.0 gm. (0.5 moles) | |
| (ii) Chloroform | 500 ml | |
| (iii) Quinoline | 65 gm. (0.5 moles) | |

The resulting mixture is cooled to 5° C and 80 gm of bromine (0.5 moles) in 125 ml of chloroform is added to the reaction mass over a period of two hours, while maintaining the temperature thereof in the range of 0°–5° C. After bromine addition, the reaction mass is stirred for one hour at 5° C and then allowed to warm up to room temperature. The chloroform solvent is then removed at reduced pressure and the resulting residue is heated using a steam bath for 3 hours, with N,N dimethylaniline. The reaction mass is then cooled and 30 ml pyridine is added. The reaction mass is then heated for a period of 30 minutes using the steam bath.

The resulting mixture is cooled and then added to a mixture of 600 ml n-pentane and 600 ml 5N hydrochloric acid. The resulting mixture now exists in two phases; an aqueous phase and an organic phase. The aqueous phase is extracted with three 100 ml portions of n-pentane. The pentane portions are combined with the organic phase and the resulting material is washed as follows:
i. Twice with 5N hydrochloric acid
ii. Twice with 10% sodium bicarbonate solution
iii. Twice with saturated sodium chloride solution The resulting material is then dried over anhydrous magnesium sulfate and evaporated yielding 94.3 gm of crude. The crude material is distilled on a microvigreaux column at 93°–96° C and a pressure of 0.6–0.9 mm Hg. IR, NMR and mass spectral analyses yield the information that the material is a mixture of compounds having the structures:

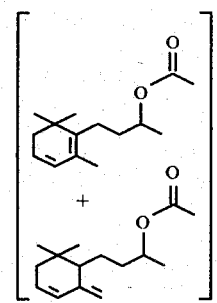

The weight ratio of cyclohexadiene derivative: methylene cyclohexene derivative is 65:18. This material has a woody, fruity, leathery, ionone, seashore, fatty aroma with a slight musky nuance.

EXAMPLE IV

Saponification of Dehydrodihydroionol Acetate to Form Dehydrodihydroionol

Reaction:

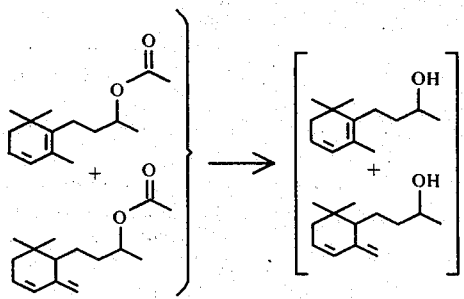

The following materials are added to a two liter flask equipped with stirrer and thermometer:

| | |
|---|---|
| Dehydrodihydroionol acetate (produced according to the process of Example III) | 64.9 g |
| Potassium Hydroxide | 24.0 g |
| 95% Ethyl Alcohol | 600 ml |

The resulting mixture is stirred for a period of 15 hours and then neutralized with 80 ml of 5N hydrochloric acid. The ethyl alcohol is removed under reduced pressure at 50° C and the reaction mass is then diluted with 200 ml of diethyl ether. The reaction mass is then washed with two 100 ml portions of saturated sodium chloride solution, after which the ether is evaporated yielding a 51.2 g of crude product. The crude product is distilled on a microvigreaux column at 89°–90° C and a pressure of 0.7–1 mm Hg pressure to yield a mixture of compounds having the structures:

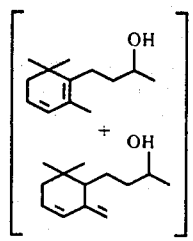

These structures are confirmed by GLC, mass spectral and IR analyses. The weight ratio of cyclohexadiene derivative:methylene cyclohexene derivative is 65:18. The mixture is separable by means of GLC separation. The mixture as well as the two major individual components thereof have a leathery, green, seashore, orris, mimosa, clary sage aroma with a slightly musky nuance.

The GLC curve for the resulting mixture is set forth in FIG. 1. A third component of the mixture, in a minor proportion, is original reactant, dihydro-α-ionol.

The NMR spectrum for 4-(2,6,6-trimethyl-1,3-cyclohexadien-1-yl)-2-butanol is set forth in FIG. 2.

The Infra-Red spectrum for 4-(2,6,6-trimethyl-1,3-cyclohexadien-1-yl)-2-butanol is set forth in FIG. 3.

The NMR analysis for 4-(2,6,6-trimethyl-1,3-cyclohexadien-1-yl)-2-butanol is as follows:

| ppm | Interpretation | |
|---|---|---|
| 1.00 ppm (s) | $CH_3-\underset{\vert}{\overset{\vert}{C}}-CH_3$ | 6H |
| 1.23 ppm (d) | $CH_3-C-O$ | 3H |
| 1.70 ppm – 1.36 ppm (m) | $-CH_2-$ | 3H |
| 1.74 (ppm) (s) | $=C-CH_3$ | 3H |
| 2.04 ppm (d) | $=C-CH_2-\underset{\vert}{\overset{\vert}{C}}-$ | 2H |
| 2.14 ppm (t) | $=C-CH_2-$ | 2H |
| 3.84 ppm (m) | $HC-O-$ | 1H |
| 5.70 ppm (m) | $\underset{\vert}{H}C=\underset{\vert}{C}H$ | 2H |

EXAMPLE V

Orris Absolute Formulation

The following formulation is prepared:

| Ingredients | Parts by Weight |
|---|---|
| Dehydrodihydroionol prepared by the process of Example IV | 600 |
| p-t-amyl cyclohexanone | 50 |
| Methyl ionone | 75 |
| Dibutyl sulfide | 1 |
| 2-Nonenal | 2 |
| Ionone | 10 |

-continued

| Ingredients | Parts by Weight |
|---|---|
| Diethyl phthalate | 262 |

The dehydrodihydroionol produced by the process of Example IV imparts the main, deep, waxy, floral body of this orris absolute composition.

EXAMPLE VI

Orris Absolute Formulation

The following formulation is prepared:

| Ingredients | Parts by Weight |
|---|---|
| Dehydrodihydroionol acetate prepared by the process of Example III | 600 |
| p-t-amyl cyclohexanone | 50 |
| Methyl Ionone | 75 |
| Dibutyl sulfide | 1 |
| 2-Nonenal | 2 |
| Diethyl phthalate | 262 |
| Ionone | 10 |

The dehydrodihydroionol acetate produced by the process of Example III imparts the main, deep, waxy, floral body of this orris absolute composition.

EXAMPLE VII

Perfume Formulation

The following mixture is prepared:

| Ingredients | Parts by Weight |
|---|---|
| Methyl Acetophenone | 4 |
| Terpineol | 450 |
| Phenyl Ethyl Alcohol | 50 |
| Bergamot Oil | 20 |
| Methyl Heptinyl Carbonate | 1 |
| 4-(2,6,6-trimethyl-1,3-cyclohexadien-1-yl)-2-butanol | 20 |
| Heliotropin | 30 |
| Anisic Aldehyde | 180 |
| Methyl Anthranilate | 5 |
| Jasmine Absolute | 30 |
| Cinnamic Alcohol | 100 |
| Cassie Absolute | 10 |
| Hydroxycitronellal | 100 |

The 4-(2,6,6-trimethyl-1,3-cyclohexadien-1-yl)2-butanol imparts to this formulation a low keyed floral, seashore, clary sage, orrisy character which are included in the key odor characteristics of this type of aroma.

EXAMPLE VIII

Preparation of Soap Composition

One hundred grams of soap chips are mixed with one gram of the perfume composition of Example VII until a substantially homogeneous composition is obtained. The perfumed soap composition exhibits a floral, seashore, clary sage, orrisy characteristic.

EXAMPLE IX

Preparation of a Detergent Composition

A total of 100 grams of a detergent powder is mixed with 0.15 grams of the perfume composition of Example VII until a substantially homogeneous composition is prepared. This composition exhibits a floral, seashore, clary sage, orrisy fragrance.

EXAMPLE X

Preparation of a Cosmetic Powder Composition

A cosmetic powder is prepared by mixing in a ball mill 100 grams of talcum powder with 0.25 grams of 4-(2,6,6-trimethyl-1,3-cyclohexadien-1-yl)-2-butanol. It has an excellent clary sage, orris, mimosa, seashore aroma.

EXAMPLE XI

Perfumed Liquid Detergent

Concentrated liquid detergent with a rich mimosa character are obtained containing 0.10%, 0.15% and 0.20% of 4-(2,6,6-trimethyl-1,3-cyclohexadien-1-yl)-2-butanol. They are prepared by adding and homogeneously mixing the appropriate quantity of 4-(2,6,6-trimethyl-1,3-cyclohexadien-1-yl)-2-butanol in the liquid detergent. The detergents all possess a clary sage, orris, mimosa, seashore fragrance, the intensity increasing with greater concentrations of 4-(2,6,6-trimethyl-1,3-cyclohexadien-1-yl)-2-butanol.

EXAMPLE XII

Cologne 4-(2,6,6-Trimethyl-1,3-cyclohexadien-1-yl)-2-butanol is incorporated in a cologne at a concentration of 2.5% in 85% aqueous ethanol; and into a handkerchief perfume at a concentration of 5% (in 95% aqueous ethanol). A distinct and definite clary sage, orris, mimosa, seashore fragrance is imparted to the cologne and to the handkerchief perfume.

EXAMPLE XIII

The composition of Example V is incorporated in a cologne at a concentration of 2.5% in 85% aqueous ethanol; and into a handkerchief perfume at a concentration of 20% (in 95% aqueous ethanol). The composition of Example V affords a distinct and definite strong orris fragrance to that handkerchief perfume and cologne.

EXAMPLE XIV

Flavor Formulation

The following mixture is prepared:

| Ingredients | Parts by Weight |
|---|---|
| Vanillin | 20 |
| Allyl Caproate | 10 |
| Citral | 20 |
| Amyl Butyrate | 35 |
| Orange Oil | 45 |
| Ethyl Butyrate | 75 |
| Ethyl Acetate | 185 |
| Amyl Acetate | 185 |
| Lemon Oil | 400 |

4-(2,6,6-Trimethyl-1,3-cyclohexadien-1-yl)-2-butanol was added to 975 grams of the above mixture which was then called "Test Composition". A control composition was prepared by adding 25 grams of additional lemon oil to 975 grams of the above mixture.

The test and control compositions were added to the food products described hereinafter and the proportions shown for 100 kilograms of material to be flavored:

| | |
|---|---|
| Cake | 20 grams |
| Pudding | 5–10 grams |
| Cooked sugar | 15–20 grams |

Cooked sugar — 100 ml of sugar syrup (prepared by dissolving 1 kilogram of sucrose in 600 ml of water) and 20 grams of glucose were mixed together and slowly heated to 145° C. The flavor was added and the mass allowed to cool and harden.

Pudding — To 500 ml of warmed milk were added with stirring a mixture of 60 grams sucrose and 3 grams of pectin. The mixture was boiled for a few seconds and the flavor was added. The mixture was allowed to cool.

Cake — The following ingredients were mixed together:

| | |
|---|---|
| Vegetable margarine | 100 grams |
| Sodium Chloride | 1.5 grams |
| Sucrose | 100 grams |
| Eggs | 2 |
| Flour | 100 grams |

The flavor was added and the mass was cooked for 40 minutes at 180° C. The finished foodstuff samples were tested by a panel of trained persons who had to express their views about the flavor of the samples. All members of the panel declared with no hesitation that the test samples had a more distinguished fruity and woody note than the control samples and at the same time a red-berry character.

EXAMPLE XV

Raspberry Flavor

The following mixture is prepared:

| Ingredient | Parts by Weight |
|---|---|
| Para-hydroxy benzyl acetone | 5 |
| Vanillin | 2 |
| Maltol | 3 |
| Alpha-Ionone (1% solution in propylene glycol) | 15 |
| Isobutyl Acetate | 15 |
| Ethyl Butyrate | 5 |
| Ethyl Acetate | 5 |
| Dimethyl Sulfide (10% solution in propylene glycol) | 5 |
| Acetic acid | 15 |
| Acetaldehyde | 20 |
| Propylene Glycol | 910 |

A 65:18 wt/wt mixture of 4-(2,6,6-trimethyl-1,3-cyclohexadien-1-yl)-2-butanol:4-(6,6-trimethyl-2-methylene-3-cyclohexen-1-yl)-2-butanol (produced by the process of Example IV) is added to the above mixture at the rate of 0.1%. A flavor formulation with this mixture of butanol derivatives is then compared with the same flavor formulation without the mixture of butanol derivatives at the rate of 0.01% in water (100 ppm) by a bench panel. The flavor formulation containing the mixture of butanol derivatives has a strong delicate raspberry aroma and a cooked jam-like raspberry taste which characteristics are not reproduced by the flavor formulation which does not contain the mixture of butanol derivatives.

EXAMPLE XVI

Raspberry Flavor

The following mixture is prepared:

| Ingredient | Parts by Weight |
| --- | --- |
| Para-hydroxy benzyl acetone | 5 |
| Vanillin | 2 |
| Maltol | 3 |
| Alpha-Ionone (1% solution in propylene glycol) | 15 |
| Isobutyl acetate | 15 |
| Ethyl Butyrate | 5 |
| Ethyl Acetate | 5 |
| Dimethyl Sulfide (10% solution in propylene glycol) | 5 |
| Acetic acid | 15 |
| Acetaldehyde | 20 |
| Propylene Glycol | 910 |

4-(6,6-dimethyl-2-methylene-3-cyclohexen-1-yl)-2-butanol is added to the above mixture at the rate of 0.1%. A flavor formulation with this butanol derivative is then compared with the same flavor formulation without the butanol derivative at the rate of 0.01% in water (100 ppm) by a bench panel. The flavor formulation containing the butanol derivative has a strong delicate raspberry aroma and a cooked jam-like raspberry taste which characteristics are not reproduced by the flavor formulation which does not contain the butanol derivative.

EXAMPLE XVII

Raspberry Flavor

The following mixture is prepared:

| Ingredient | Parts by Weight |
| --- | --- |
| Para-hydroxy benzyl acetone | 5 |
| Vanillin | 2 |
| Maltol | 3 |
| Alpha-ionone (1% solution in propylene glycol) | 15 |
| Isobutyl acetate | 15 |
| Ethyl butyrate | 5 |
| Ethyl Acetate | 5 |
| Dimethyl Sulfide (10% solution in propylene glycol) | 5 |
| Acetic acid | 15 |
| Acetaldehyde | 20 |
| Propylene Glycol | 910 |

4-(2,6,6-trimethyl-1,3-cyclohexadien-1-yl)-2-butanol is added to the above mixture at the rate of 0.1%. A flavor formulation with this butanol derivative is then compared with the same flavor formulation without this butanol derivative at the rate of 0.01% in water (100 ppm) by a bench panel. The flavor formulation containing the butanol derivative has a strong delicate raspberry aroma and a cooked jam-like raspberry taste which characteristics are not reproduced by the flavor formulation which does not contain the butanol derivative.

EXAMPLE XVIII

The following mixture is prepared:

| Ingredients | Parts by Weight |
| --- | --- |
| Natural Raspberry Concentrate Juice | 2½% |
| Water | 85% |
| Sugar syrup (37½° Baume) | 12½% |

The seedy note of this raspberry juice is imparted in increasing strength by addition of either of the following materials at the rate of from 0.02 ppm up to 1.0 ppm:
  4-(2,6,6-trimethyl-1,3-cyclohexadien-1-yl)-2-butanol
  4-(6,6-dimethyl-2-methylene-3-cyclohexen-1-yl)-2-butanol
  65:18 weight:weight mixture of 4-(2,6,6-trimethyl-1,3-cyclohexadien-1-yl)-2-butanol and 4-(6,6-dimethyl-2-methylene-3-cyclohexen-1-yl)-2-butanol

EXAMPLE XIX

Perfume Formulation

The following mixture is prepared:

| Ingredients | Parts by Weight |
| --- | --- |
| Indol | 2.0 |
| Methyl Anthranilate | 2.0 |
| n-Heptyl Cyclopentanone | 3.0 |
| Grisalva (produced by the 50% surfuric acid treatment of 3-ethyl-1-(2,6,6-trimethyl-cyclohexen-5-yl-1)-hexen-3-ol-6) | 4.0 |
| 6,7-Dihydro-1,1,2,3,3-pentamethyl-4-(5H) indanone (produced according to the preparation of A of Swiss Patent 523,962) | 2.0 |
| Oil of Bitter Orange | 5.0 |
| 2-Oxa-1,1,3,3-tetramethyl-2,3,5,6,7,8-hexahydro-1H-benz-(f)-indene | 5.0 |
| Terpineol Coeur | 10.0 |
| Nerolidol | 10.0 |
| 2-t-butyl-cyclohexanyl acetate | 20.0 |
| Linalyl Acetate | 90.0 |
| Linalool | 110.0 |
| 4-(4-methyl-4-hydroxyamyl)-Δ3-cyclohexene-carboxaldehyde | 20.0 |
| Benzyl Alcohol | 90.0 |
| Benzyl Acetate | 150.0 |
| 4-(2,6,6-trimethyl-1,3-cyclohexadien-1-yl)-2-butanol | 3.0 |

The 4-(2,6,6-trimethyl-1,3-cyclohexadien-1-yl)-2-butanol imparts to the above floral type formulation, a clary sage, orris, mimosa, seashore aroma.

EXAMPLE XX

Perfume Formulation

The following mixture is prepared:

| Ingredients | Parts by Weight |
| --- | --- |
| Indol | 2.0 |
| Methyl Anthranilate | 2.0 |
| n-Heptyl Cyclopentanone | 3.0 |
| Grisalva (produced by the 50% sulfuric treatment of 3-ethyl-1-(2,2,6-trimethyl-cyclohexen-5-yl-1)-hexen-3-ol-6) | 4.0 |
| 6,7-Dihydro-1,1,2,3,3-pentamethyl-4-(5H) indanone (produced according to the preparation of A of Swiss Patent 523,962) | 2.0 |
| Oil of Bitter Orange | 5.0 |
| 2-Oxa-1,1,3,3-tetramethyl-2,3,5, | 5.0 |

-continued

| Ingredients | Parts by Weight |
|---|---|
| 6,7,8-hexahydro-1H-benz-(f)-indene | |
| Terpineol Coeur | 10.0 |
| Nerolidol | 10.0 |
| 2-t-butyl-cyclohexanyl acetate | 20.0 |
| Linalyl Acetate | 90.0 |
| Linalool | 110.0 |
| 4-(4-methyl-4-hydroxyamyl)-Δ3-cyclo-hexene-carboxaldehyde | 20.0 |
| Benzyl Alcohol | 90.0 |
| Benzyl Acetate | 150.0 |
| 4-(6,6-dimethyl-2-methylene-3-cyclo-hexen-1-yl)-2-butanol | 3.0 |

The 4-(6,6-dimethyl-2-methylene-3-cyclohexen-1-yl)-2-butanol imparts to the above floral type formulation, a clary sage, orris, mimosa, seashore aroma.

EXAMPLE XXI

Perfume Formulation

The following mixture is prepared:

| Ingredients | Parts by Weight |
|---|---|
| Indol | 2.0 |
| Methyl Anthranilate | 2.0 |
| n-Heptyl Cyclopentanone | 3.0 |
| Grisalva (produced by the 50% sulfuric acid treatment of 3-ethyl-1-(2,2,6-trimethyl-cyclohexen-5-yl-1)-hexen-3-ol-6) | 4.0 |
| 6,7-Dihydro-1,1,2,3,3-pentamethyl-4-(5H) indanone (produced according to the preparation of A of Swiss Patent 523,962) | 2.0 |
| Oil of Bitter Orange | 5.0 |
| 2-Oxa-1,1,3,3-tetramethyl-2,3,5,6,7,8-hexahydro-1H-benz-(f)-idene | 5.0 |
| Terpineol Coeur | 10.0 |
| Nerolidol | 10.0 |
| 2-t-butyl-cyclohexanyl acetate | 20.0 |
| Linalyl Acetate | 90.0 |
| Linalool | 110.0 |
| 4-(4-methyl-4-hydroxyamyl)Δ3-cyclo-hexene-carboxaldehyde | 20.0 |
| Benzyl Alcohol | 90.0 |
| Benzyl Acetate | 150.0 |
| 65:18 weight:weight mixture of a 4-(2,6,6-trimethyl-1,3-cyclohexadien-1-yl)-2-butanol and 4-(6,6-dimethyl-2-methylene-3-cyclohexen-1-yl)-3-butanol | 3.0 |

The mixture of 4-(2,6,6-trimethyl-1,3-cyclohexadien-1-yl)-2-butanol and 4-(6,6-dimethyl-2-methylene-3-cyclohexen-1-yl)-2-butanol imparts to the above floral type formulation a clary sage, orris, mimosa, seashore aroma.

EXAMPLE XXII

Perfume Formulation

The following mixture is prepared:

| Ingredients | Parts by Weight |
|---|---|
| Methyl Acetophenone | 4 |
| Terpineol | 450 |
| Phenyl Ethyl Alcohol | 50 |
| Bergamot Oil | 20 |
| Methyl Heptinyl Carbonate | 1 |
| Product produced according to the process of Example III | 20 |
| Heliotropin | 30 |
| Anisic Aldehyde | 180 |
| Methyl Anthranilate | 5 |
| Jasmine Absolute | 30 |
| Cinnamic Alcohol | 100 |
| Cassie Absolute | 10 |
| Hydroxycitronellal | 100 |

The product produced by the process of Example III imparts to this formulation a woody, fruity, leathery, ionone, fatty character with a slightly musky nuance which are included in the key odor characteristics of this type of aroma.

EXAMPLE XXIII

Preparation of Soap Composition

One hundred grams of soap chips are mixed with one gram of the perfume composition of Example XXII until a substantially homogeneous composition is obtained. The perfumed soap composition exhibits a woody, fruity, leathery, ionone, fatty character with a slightly musky nuance.

EXAMPLE XXIV

Preparation of a Detergent Composition

A total of 100 grams of a detergent powder is mixed with 0.15 grams of the perfume composition of Example XXII until a substantially homogeneous composition is prepared. This composition exhibits a woody, fruity, leathery, ionone, fatty character with a slightly musky nuance.

EXAMPLE XXV

Preparation of a Cosmetic Powder Composition

A cosmetic powder is prepared by mixing in a ball mill 100 grams of talcum powder with 0.25 grams of the product produced by the process of Example III. It has an excellent woody, fruity, leathery, ionone, fatty character with a slightly musky nuance.

EXAMPLE XXVI

Perfumed Liquid Detergent

Concentrated liquid detergent with a rich woody, fruity, leathery, ionone, fatty character are obtained containing 0.10%, 0.15% and 0.20% of the product produced by the process of Example III. They are prepared by adding and homogeneously mixing the appropriate quantity of the product produced by the process of Example III in the liquid detergent. The detergents all possess a woody, fruity, leathery, ionone, fatty character with a slightly musky nuance, the intensity increasing with greater concentrations of the product produced by the process of Example III.

EXAMPLE XXVII

Cologne

The product produced by the process of Example III is incorporated in a cologne at a concentration of 2.5% in 85% aqueous ethanol; and into a handkerchief perfume at a concentration of 5% (in 95% aqueous ethanol). A distinct and definite woody, fruity, leatherly, ionone, fatty fragrance is imparted to the cologne and to the handkerchief perfume.

What is claimed is:
1. A mixture of compounds having the structures:

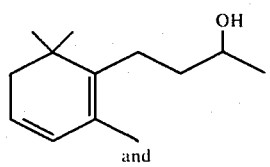
and
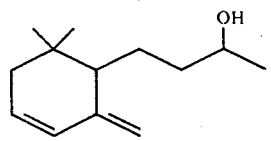
wherein the ratio of the compound having the structure:
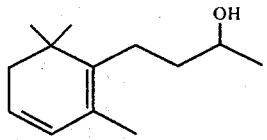
:the compound having the structure:
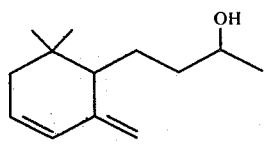
is 65:18.
* * * * *